Patented Apr. 17, 1951

2,549,378

UNITED STATES PATENT OFFICE 2,549,378

SEPARATION OF AMINO ACIDS

Robert Kunin, Trenton, N. J., assignor to Rohm & Haas Company, Philadelphia, Pa., a corporation of Delaware No Drawing. Application March 16, 1948, Serial No. 15,260

10 Claims. (Cl. 260—309)

This invention relates to a process of separating the basic amino acids from one another and from the neutral and acidic amino acids. It is particularly applicable to the separation of basic amino acids from protein hydrolysates and to their recovery in a purified form.

Amino acids are customarily classified as acid amino acids, neutral amino acids, and basic amino acids. By "acid amino acids" is meant those amino acids that have a greater number of carboxyl groups than amino groups, particularly dicarboxylic mono amino acids. The "neutral amino acids" are those having an equal number of carboxyl and amino groups. The "basic amino acids" are those in which there are a greater number of amino groups than there are carboxyl groups. When proteins are hydrolyzed either by acid, alkali, or enzymatic digestion, a mixture of amino acids from all three of these classes is obtained. Chemical methods of separating such mixtures are quite complicated and unsatisfactory. It has heretofore been proposed to use ion-exchange resins of the sulfonated phenol-formaldehyde type and also sulfonated naturally occurring carbonaceous materials to separate the basic amino acids, but difficulty has been encountered in removing the adsorbed amino acids from the adsorption material even when a large excess of strong acid is used in eluting.

In U. S. Patents Nos. 2,340,110 and 2,340,111 there are described ion-exchange resins made by the copolymerization of a polymerizable acid and a polymerizable divinyl compound having non-conjugated double bonds. These resins, by reason of the large number of carboxyl groups they contain, have high capacities and, in comparison with the ion-exchange materials containing sulfonic acid groups, they are weakly acidic. When a salt of a strong acid such as sodium chloride is passed in solution through a column of sulfonic acid type ion-exchange material, the cation is adsorbed by the resin in exchange for hydrogen and the effluent leaving the column will contain the strong acid. The carboxylic acid type ion-exchange resins do not have the ability to split salts in this manner except in the case of salts of very weak acids. They will effectively exchange hydrogen ions for salt-forming cations only when the pH of the solution being treated is near neutrality or on the alkaline side. This greatly limits their usefulness in the acid form.

I have found that the usefulness of these resins in the separation of basic organic compounds can be greatly increased by using them in the form of a salt rather than in their acid form; then eluting adsorbed materials with acid and completing the cycle by converting the acid-treated resin to its salt form by means of a free base. A practical application of this mode of operation is the separation of the vitamin thiamine from neutral solutions containing it. If such a solution is passed through a carboxylic acid resin of the type above-described, the vitamin is not adsorbed. If, however, the resin is converted to its sodium or ammonium form by treatment with sodium or ammonium hydroxide solution, and the thiamine solution then passed through, the vitamin is readily adsorbed. The absorbed thiamine may be eluted from the resin by passing through the bed the stoichiometric equivalent amount of 0.1N hydrochloric acid and the resin converted to its salt form by treating it with a 0.1N solution of sodium or ammonium hydroxide. In the case of a sulfonic acid type exchanger, it requires over one hundred times the stoichiometric equivalent amount of 37% hydrochloric acid to remove 50 percent of the adsorbed thiamine. In like manner, quinine is readily adsorbed by the salt form of the carboxylic resins and readily eluted with dilute acid.

When an attempt was made to separate basic amino acids from protein hydrolysates, it was found that no significant adsorption was effected from neutral solutions when the carboxylic resin was in the acid form and that only arginine was separated when the resin was used in the alkali metal form, and even in this instance only a partial separation was accomplished. An investigation of this has led to the discovery of operating techniques by which these carboxylic type resins may be utilized not only for the separation of the basic amino acids from protein hydrosylates but may also be employed for the separation of various basic amino acids from each other. In general, this is accomplished by adjusting the pH of the amino acid solution being treated and the ratio of acid groups to salt groups in the resin so that the solution in contact with the resin remains at a pH between the isoelectric point of the amino acid or acids it is desired be adsorbed and the isoelectric point of the amino acids it is desired be not adsorbed.

According to modern theory, an amino acid at its isoelectric point in solution exists largely as a dipolar molecule; i. e., (1) 

On the acid side of the isoelectric point it exists largely as a cation, (2) $NH_3-R-COO^- + [H^+] \rightleftharpoons NH_3^+ - R - COOH$ Conversely, on the alkaline side of its isoelectric point it exists largely as an anion, (3) $NH_3^+ - R - COO^- + [OH^-]$
$\rightleftharpoons NH_2 - R - COO^- + H_2O$ From these equations it may be seen that an amino acid is in the cationic form only when its solution is on the acid side of its isoelectric point. Since the carboxylic resins heretofore-mentioned are cation action, it is a reasonable hypothesis to assume that they will adsorb an amino acid only from a solution having a pH on the acid side of the amino acid's isoelectric point. The basic amino acids in protein hydrolysates are largely arginine having an isoelectric point of pH 10.8, lysine having an isoelectric point of pH 9.7, and histidine having an isoelectric point of pH 7.6. To have all these basic amino acids in the cationic form would, therefore, require a pH of less than 7.6 but, as has heretofore been stated, at this pH the carboxylic resins in the hydrogen form will adsorb none of the amino acids and in the sodium form will adsorb only the arginine.

From observations previously made which showed that the sodium salt form of these carboxylic ion-exchange resins is a more efficient exchange medium than is the hydrogen form and, from the fact that, as sodium passes into solution either by the hydrolysis of the resin or in exchange for amino acids, the pH of the solution being treated is increased, it occurred to me that, if a sufficient number of sodium salt groups were present in the resin to actively adsorb amino acids and at the same time there were a sufficient number of acid hydrogen ions in the resin to neutralize the alkali thus liberated and prevent the pH of the solution from rising to above the isoelectric point of the amino acid to be adsorbed, an efficient adsorption and separation of amino acids might be possible. Experiments conducted to test the correctness of this reasoning has confirmed its soundness beyond initial expectation.

I have found that by treating a carboxylic ion-exchange resin in its sodium salt form with a buffered solution, such as a sodium acetate-acetic acid buffer, the resin is converted to a mixed sodium salt-carboxylic acid form of ion-exchange resin in which the relative number of sodium salt groups and carboxylic acid groups present is dependent upon the pH of the buffer; and that by using a resin having the proper ratio of sodium salt groups to carboxylic acid groups any of the basic amino acids may be readily adsorbed without appreciable change in the pH of the solution in contact with the resin. Thus, if it is desired to separate the basic amino acids from a solution containing also neutral and acidic amino acids, a resin can be prepared which will operate at a pH between 6.3 and 7.6 to adsorb all the basic amino acids in the solution and none of the neutral or acidic amino acids. Or, if it is desired to separate histidine from a mixture of basic amino acids, a resin can be prepared which will operate at a pH between 7.6 and 9.7 to adsorb the amino acids, arginine, and lysine and allow the histidine to pass through unadsorbed. By combining such operations as hereinafter described, the basic amino acids may not only be separated from mixtures that also contain neutral and acidic amino acids but may also be separated from one another.

I have found that a carboxylic ion-exchange resin having the proper ratio of sodium salt groups to carboxylic acid groups to operate at a pH between 6.3 to 7.6 for the adsorption of the basic amino acids from solutions that also contain neutral and acidic amino acids can be prepared by treating the resin in its sodium salt form with a buffer solution having a pH of from 4.2 to 5.5, preferably about 4.7. It will be appreciated, however, that in any given adsorption system there are various factors that influence the pH, as, for instance, the buffering effect of unadsorbed amino acids, and it will, therefore, be desirable to determine for any particular amino acid solution to be separated the optimum pH of the buffer solution to be used in the preparation of the resin. This may be done by treating different samples of the resin with buffers of different pH, passing a portion of the solution of amino acids which has been adjusted to the proper pH through a column of the resins so treated and measuring the pH of the effluent. That buffer which produces a resin which, when so tested, does not cause an appreciable change in the pH of the amino acid solution as it passes through the column is satisfactory for operations to be conducted at the pH of the amino acid solution. For a resin to operate at a pH of from 7.6 to 9.7 I have found that a buffer of pH from 5.8 to 7.5, preferably about 7.0, should be used but here again particular conditions existing in a given solution may make it desirable to vary somewhat from this pH.

In the operation of a column of ion-exchange resin in accordance with this invention, there are four steps in a complete cycle. These are:
1. Converting the resin to the salt form.
2. Treating the resin in its salt form with a buffer of proper pH.
3. Passing the amino solution through the column of resin.
4. Eluting adsorbed amino acids.

The first of these steps is accomplished by passing a solution of sodium hydroxide through the bed of resin. A 0.1 normal solution is satisfactory but any concentration will work. After draining the solution from the column it is desirable to rinse the resin with water until the effluent has a pH of approximately 10. The second step may be carried out by passing through the column a volume of buffer solution equal to the volume of the column and then allowing the resin to remain in contact with a second volume of the buffer for several minutes. Alternatively, the buffer may be run continuously through the bed. The buffer may be a 0.1 normal solution of sodium acetate buffered with acetic acid to the proper pH, but, here again, concentration is not critical. After the buffer solution is drained from the column, the resin is again rinsed and is then ready for the solution of amino acids.

The solution of amino acids fed to the column should have a pH of approximately that which is to prevail in the column but may, if desired, be slightly above or below the desired range; i. e., slightly above the isoelectric point of the amino acid to be adsorbed or slightly below the isoelectric point of the amino acid not to be adsorbed. It is sometimes desirable to have this condition exist, particularly when a series of exchange separations are being run. When the initial pH is slightly outside the desired range, the ratio of sodium and acidic hydrogen ions in the resin may be adjusted to bring the pH into the desired range during the adsorption. It is preferable that the initial pH be on the low side rather than on the high side of the optimum range. The rate at which the solution of amino acids is fed through the column and the concentration of amino acids in the solution may be varied over a wide range. I have found that a one-tenth percent solution of amino acids when passed through the resin at the rate of one volume of solution through ten volumes of resin per minute gives very satisfactory results.

An important advantage which the carboxylic acid resins have over sulfonic type materials in the adsorption of amino acids is the ease with which the amino acids may be removed from the resins. They may be removed with substantially the stoichiometric equivalent of strong mineral acid, a slight excess being preferable. The concentration of acid in the eluting solution may be as low as 0.01N. Weak acids may also be used to elute the adsorbed amino acids and I have found that, when it is desirable to obtain amino acids free from the anions of strong mineral acids, the elution can be effectively accomplished by an aqueous solution of carbon dioxide under pressure. While I prefer to elute with acid, the amino acids may also be removed from the resin by passing through the column an alkaline solution such as a solution of sodium hydroxide or ammonia.

In the separation of a mixture of amino acids such as exists in a protein hydrolysate, the order of separation may be selected to suit any particular desire. Thus, by operating first at a pH between 6.3 and 7.6 the basic amino acids as a group may be separated from the neutral and acidic amino acids, then by passing the separated basic amino acids through a column of resin adjusted to operate between 7.6 and 9.8 the histidine may be separated from the arginine and lysine, and finally by using a full sodium salt of the resin and operating at a pH of 10 the arginine may be separated from the lysine. Or, the arginine may be separated first or the arginine and lysine may be separated as a mixture followed by a further separation of the mixtures remaining. In making each separation, passing the mixture through a single bed of resin usually results in a practical adsorption of the amino acid to be adsorbed free from those acids not to be adsorbed. It is sometimes desirable, however, to use two beds of resin. This is particularly true in the separation of arginine from lysine or mixtures containing lysine wherein better separation and higher resin capacity is obtained if the first bed is operated until the effluent contains from 10 to 20% of the arginine before it is regenerated and the effluent is then passed through a second bed to adsorb this 10 to 20%. The resin used in this second bed may then, if desired, be used as the first bed in treating additional solution.

The following examples are given to illustrate the application of my process to specific mixtures of amino acids. In these examples the resin used was a copolymer of 95 parts of methacrylic acid and 5 parts of divinyl benzene made by polymerizing a mixture of the monomeric materials while they were suspended in an aqueous medium.

Example 1

A column of exchange resin in its hydrogen form was leached at a rate of 0.13 cc./cc./min. with a 0.1 normal solution of sodium hydroxide until sodium hydroxide appeared in the effluent. Distilled water was then passed through the column to remove the excess sodium hydroxide. A 1.0 normal solution of sodium acetate buffered to a pH of 4.7 was then passed through the column until three times the volume of the column had passed through. Again the bed was rinsed with distilled water.

A neutral mixture of amino acids that contained arginine, lysine, histidine, leucine, and glutamic acid was passed as a 1% aqueous solution through the column at a rate of approximately 0.2 cc./cc./min. until histidine was detected in the effluent. The column was then drained, rinsed, and eluted with 0.1 normal hydrochloric acid, four milliequivalents of acid being used for each gram of resin. A mixture of arginine, lysine, and histidine in an amount equal to one kilogram per cubic foot of resin and substantially free of neutral and acidic amino acids was recovered from the resin. The effluent up to the point of breakthrough contained the leucine and glutamic acid but none of the basic amino acids.

Example 2

A column of exchange resin was conditioned as in Example 1 by treating with sodium hydroxide solution and a sodium acetate-acetic acid buffer with the exception that the buffer used had a pH of 7.0.

A neutral 1% aqueous solution of arginine, lysine, and histidine was passed through the column until lysine appeared in the effluent. The column was then drained, rinsed, and eluted as in Example 1. Three and eight-tenths kilograms of a histidine-free mixture of arginine and lysine per cubic foot of resin were recovered in the solution. The effluent obtained before the elution step contained only histidine.

Example 3

A column of exchange resin in its hydrogen form was treated with a sodium hydroxide solution as in Example 1 and rinsed. A mixture of amino acids as was used in Example 2 but having a pH of approximately 10 was passed through the column. Only arginine was adsorbed by the resin but some passed through unadsorbed. When the resin was eluted as in the previous examples, it was found to have adsorbed four kilograms of arginine per cubic foot. The effluent from the adsorption step contained the lysine and histidine and a substantially reduced amount of arginine. It may be adjusted to a pH of neutrality or slightly above and then passed through a second column of resin that has been treated as in Example 2 with a buffer of pH 7.0. The remaining arginine and lysine will thereby be adsorbed and separated from the histidine which passes through the column unadsorbed. Eluting the second column produces lysine containing some arginine and it may be further purified by passing it at a pH of approximately 10 through a column of resin as was first used.

In place of the mixture of basic amino acids used in Example 3, a mixture which also contains neutral and acidic amino acids may be treated in the same manner in which event the effluent from the second adsorption step will contain the neutral and acidic amino acids as well as the histidine. This mixture may then be treated in the manner illustrated by Example 1 whereby the histidine is adsorbed by the resin and thereby separated from the neutral and basic amino acids which pass through.

In place of the divinyl benzene-methacrylic acid resin used in the foregoing examples, other carboxylic type, insoluble resins may be used. The aforementioned U. S. Patents Nos. 2,340,110 and 2,340,111 described numerous resins of this type. The essential qualities of these resins are their two-dimensional or cross-linked molecular structure which renders them insoluble and their numerous carboxylic groups which contribute the polarity necessary for ion-exchange activity. For reasons of economy and stability, I prefer copolymers in which the polar carboxylic groups are derived from acrylic, methacrylic, or maleic acid and the two-dimensional or cross-linked structure is derived from an aromatic divinyl compound such as divinyl benzene or divinyl naphthalene. In such resins it requires only a relatively small amount of the divinyl compound to impart the insolubility needed for a satisfactory ion-exchange resin. As little as 1% is sufficient for some purposes although 2.5% is a more practical lower limit and I should prefer to use 5% for at this ratio insolubility even at very high pH's is assured without significant sacrifice of adsorption capacity. As the ratio of divinyl compound is increased above 10%, its adsorption capacity decreases more rapidly and it is, therefore, desirable to use lower ratios.

It is also to be noted that the process may be carried out with resins in which the cation of the salt groups is other than sodium. Potassium and the other alkali metals may be used in place of sodium and in some instances it may be desirable to use a mixed ammonium salt-carboxylic acid form of resin. Generally speaking, however, the mixed sodium salt-carboxylic acid form is the most practical. Other buffer salts may likewise be used in place of the prepared sodium acetate buffer. Any salt of a strong base and a relatively weak acid, such as the alkali metal salts of phosphoric acid, citric acid, propionic or phthalic acid, may be adjusted to the appropriate pH and used in the preparation of the resin.

When protein hydrolysates made with strong mineral acids are to be used in the practice of the invention, it is desirable that the mineral acid be reduced as much as practical before adjusting the pH to the desired point. Volatile acids such as hydrochloric acid may be partially removed by steam distillation. Non-volatile acids and volatile acids not removed by steam distillation can be reduced in concentration by the stepwise addition to the solution of calculated amounts of an acid-adsorbing resin such as the resins described in U. S. Patent No. 2,402,384. In this way the pH of the solution may be raised to approximately 3 without amino acids being adsorbed. Alkali may then be used to raise the pH to the desired point.

I claim:

1. A process of separating a basic amino acid from a mixture of amino acids which comprises passing a solution of the mixture through a bed of carboxylic type ion-exchange resin containing carboxylic acid groups and carboxylic salt groups in a ratio that has been adjusted so that the pH of the amino acid solution in contact with the resin is maintained below the isoelectric point of the amino acid to be adsorbed and above the isoelectric point of the amino acid not to be adsorbed, and thereafter eluting the amino acid that has been adsorbed by said resin.

2. A process of separating a basic amino acid from a mixture of amino acids which comprises passing a solution of the mixture through a bed of carboxylic type ion-exchange resin which is a cross-linked polymer of a polymerizable acid of the group consisting of acrylic acid, methacrylic acid, and maleic acid and which contains carboxylic acid groups and carboxylic salt groups in a ratio that has been adjusted so that the pH of the amino acid solution in contact with the resin is maintained below the isoelectric point of the amino acid to be adsorbed and above the isoelectric point of the amino acid not to be adsorbed, and thereafter eluting the amino acid that has been adsorbed by said resin.

3. A process of separating basic amino acids from a mixture of amino acids that also contains neutral and acidic amino acids which comprises passing a solution of the mixture through a bed of carboxylic type ion-exchange resin which is a cross-linked polymer of a polymerizable acid of the group consisting of acrylic acid, methacrylic acid, and maleic acid and which contains carboxylic acid groups and carboxylic salt groups in a ratio that has been adjusted so that the pH of the amino acid solution in contact with the resin is maintained between pH 6.3 and pH 7.6 and thereafter eluting the basic amino acids from the resin.

4. In a process of separating a mixture of amino acids containing basic amino acid, the improvement which comprises passing an aqueous solution of the mixture through a bed of carboxylic type ion-exchange resin which contains carboxylic acid groups and sodium carboxylate groups in a predetermined ratio that will maintain the pH of the amino acid solution, as it passes through the bed, below the isoelectric point of the amino acid to be adsorbed and above the isoelectric point of the amino acid from which the adsorbed acid is to be separated.

5. In a process of separating a mixture of amino acids containing basic amino acids, the improvement which comprises passing an aqueous solution of the mixture through a bed of carboxylic type ion-exchange resin which is a copolymer of divinyl benzene and methacrylic acid and which contains carboxylic acid groups and sodium carboxylate groups in a predetermined ratio that will maintain the pH of the amino acid solution, as it passes through the bed, below the isoelectric point of the amino acid to be adsorbed and above the isoelectric point of the amino acid from which the adsorbed acid is to be separated.

6. A process of operating a column of carboxylic type ion-exchange resin to effect a separation of amino acids which comprises leaching the column of resin with a solution of a strong base, bringing the resin into contact with a buffer solution of predetermined pH adjusted to produce in the resin a balance of carboxylic acid groups and carboxylic salt groups so adjusted that the pH of the amino acid solution subsequently passing through the column is maintained below the isoelectric point of the amino acid to be adsorbed and above the isoelectric point of the amino acid not to be adsorbed, passing the amino acid solution through the column of resin and eluting adsorbed amino acid from the resin.

7. A process of operating a column of carboxylic type ion-exchange resin to effect a separation of amino acids wherein the ion-exchange resin is a cross-linked polymer of a member of the group consisting of acrylic acid, methacrylic acid, and maleic acid which comprises leaching the column of resin with a solution of an alkali metal hydroxide, bringing the resin into contact with a buffer solution of predetermined pH adjusted to produce in the resin a balance of carboxylic acid groups and alkali metal carboxylate groups so adjusted that the pH of the amino acid solution subsequently passing through the column is maintained below the isoelectric point of the amino acid to be adsorbed and above the isoelectric point of the amino acid not to be adsorbed, passing the amino acid solution through the column of resin, and passing a solution of acid through the column of resin to remove adsorbed amino acid.

8. A process of operating a column of carboxylic type ion-exchange resin to effect a separation of amino acids wherein the ion-exchange resin is a copolymer of divinyl benzene and methacrylic acid which comprises leaching the column of resin with a solution of sodium hydroxide, passing through the column a buffer solution of predetermined pH adjusted to produce in the resin a balance of carboxylic acid groups and sodium carboxylate groups so adjusted that the pH of the amino acid solution subsequently passing through the column is maintained below the isoelectric point of the amino acid to be adsorbed and above the isoelectric point of the amino acid not to be adsorbed, passing the amino acid solution through the column of resin, and passing a solution of acid through the column of resin to remove adsorbed amino acid.

9. A process of treating a mixture of amino acids containing basic, neutral, and acidic amino acids to effect a separation of the basic amino acids from the neutral and acidic amino acids which comprises conditioning a carboxylic type ion-exchange resin to operate in contact with a solution of said mixture at a pH between 6.3 and 7.6 by treating the sodium salt form of the resin with a buffer solution having a pH of approximately 4.7, passing a solution of said mixture through a bed of the resin and eluting the adsorbed basic amino acids from the resin.

10. A process of separating a mixture of amino acids containing lysine and histidine which comprises conditioning a carboxylic type ion-exchange resin to operate in contact with a solution of said mixture at a pH between 7.6 and 9.8 by treating the sodium salt form of said resin with a buffer solution having a pH of approximately 7.0, passing a solution of said mixture through a bed of the resin and eluting the adsorbed amino acids from the resin.

ROBERT KUNIN.

REFERENCES CITED

The following references are of record in the file of this patent:

UNITED STATES PATENTS

| Number | Name | Date |
|---|---|---|
| 2,375,164 | Bennett | May 1, 1945 |
| 2,375,165 | Nees et al. | May 1, 1945 |
| 2,386,926 | Block | Oct. 16, 1945 |
| 2,387,824 | Block | Oct. 30, 1945 |
| 2,429,666 | Block | Oct. 28, 1947 |
| 2,457,117 | Bernardi | Dec. 28, 1948 |

FOREIGN PATENTS

| Number | Country | Date |
|---|---|---|
| 805,092 | France | Nov. 10, 1936 |

OTHER REFERENCES

Griessbach, Melliand, Textilberichte, vol. 20, pages 577–579 (1939).

Freudenberg, "Naturwissenschaften," vol. 30, page 87 (1942).

Block, "Archives of Biochem," vol. 11, pages 235–248 (1946).